(12) United States Patent
Haridass et al.

(10) Patent No.: US 7,302,664 B2
(45) Date of Patent: Nov. 27, 2007

(54) SYSTEM AND METHOD FOR AUTOMATIC INSERTION OF ON-CHIP DECOUPLING CAPACITORS

(75) Inventors: Anand Haridass, Austin, TX (US); Andreas Huber, Austin, TX (US); Erich Klink, Schoenaich (DE); Jochen Supper, Herrenberg (DE)

(73) Assignee: International Business Machines Corporation, Armonk, NY (US)

( * ) Notice: Subject to any disclaimer, the term of this patent is extended or adjusted under 35 U.S.C. 154(b) by 340 days.

(21) Appl. No.: 11/054,916

(22) Filed: Feb. 10, 2005

(65) Prior Publication Data

US 2006/0190892 A1  Aug. 24, 2006

(51) Int. Cl.
  *G06F 17/50*  (2006.01)
(52) U.S. Cl. ............................................ 716/10; 716/5
(58) Field of Classification Search .................... 716/5, 716/10, 11, 1, 3, 8
  See application file for complete search history.

(56) References Cited

U.S. PATENT DOCUMENTS

| | | | |
|---|---|---|---|
| 6,446,016 B1 * | 9/2002 | Zhu .............................. | 702/69 |
| 6,665,843 B2 | 12/2003 | Klink et al. .................... | 716/4 |
| 6,807,656 B1 * | 10/2004 | Gradin et al. ................... | 716/4 |
| 2003/0088395 A1 | 5/2003 | Frech et al. ................... | 703/18 |

* cited by examiner

*Primary Examiner*—Vuthe Siek
(74) *Attorney, Agent, or Firm*—Francis Lammes; Stephen J. Walder, Jr.; Casimer K. Salys (57) ABSTRACT

A system and method for automatic insertion of on-chip decoupling capacitors are provided. With the system and method, an integrated circuit design is partitioned into cells and the noise distribution per cell of an integrated circuit is determined. This noise distribution may be generated using any of a number of different known mechanisms and generally results in a noise-map being generated for the integrated circuit. Thereafter, a mapping function is applied to the noise map for each cell to determine a required capacitance for the cells of the integrated circuit. From this required capacitance per cell, the necessary decoupling capacitors may be identified as well as the location for insertion of these decoupling capacitors. In a similar manner, decoupling capacitors may be removed from cells of the integrated circuit based upon the determined required capacitance per cell.

17 Claims, 4 Drawing Sheets

SYSTEM AND METHOD FOR AUTOMATIC INSERTION OF ON-CHIP DECOUPLING CAPACITORS

BACKGROUND OF THE INVENTION

1. Technical Field

The present invention relates generally to the field of design automation and computer-aided design (CAD) in the area of development of integrated circuits. More specifically, the present invention provides a system and method for automatic insertion of on-chip decoupling capacitors.

2. Description of Related Art

Complementary Metal Oxide Semiconductor (CMOS) circuit technology of today and its application in synchronously switching digital Very Large Scale Integration (VLSI) systems imposes high frequency current changes on the associated power distribution network formed by power supply wiring and decoupling capacitors. The reason lies in the semiconductor fabrication technology. CMOS circuit technology uses a combination of n- and p-doped semiconductor material to achieve low power dissipation. Any path through a gate through which current can flow includes both n- and p-type transistors. Only one type is turned on in any stable state so there is low static power dissipation. However, a higher current flows when a gate switches in order to charge a parasitic capacitance.

The imposed current changes, in return, generate noise voltages, i.e., unintentional variation of the voltage level. Because of such variations, the supply voltage level might even leave a predetermined voltage range necessary for a faultless operation of the supplied circuits, which jeopardizes the operability of the whole system. Therefore one of the major challenges in modern circuit design is to design a reliable power distribution system, i.e., a power distribution system that provides a voltage supply whose level stays within a predefined range of variation under worst case conditions. Thus, the power distribution network is designed to have a minimum amount of noise voltage even if all gates in the circuit switch at one instant of time.

The general engineering approach is to build up a power distribution network which keeps its impedance as low as possible in each branch from direct current (DC) up to the highest needed frequencies. In such a system power supply, noise is at a minimum. In order to achieve this, the designer designs a suitable power wiring structure and places decoupling capacitors along the power path from the primary power source down to the switching circuits. The decoupling capacitors provide a local capacitance at their placement location. The closer the switching circuit high frequency capacitors are placed, i.e. ones with a good high frequency response, the better the provision for high speed current changes. Ultimately, the power supply decoupling capacitors have to be distributed at the on-chip level itself among the switching circuits.

Traditionally, the distribution of on-chip power supply decoupling capacitors is performed in one of two ways. First, the decoupling capacitors may be defined prior to designing the circuits. That is, the locations and capacitance values are determined prior to the circuit itself being designed. Second, the decoupling capacitors are inserted into the "white space" after the circuit is designed. That is, decoupling capacitors are inserted into locations on the chip where the area permits insertion of decoupling capacitors. Both of these approaches have significant drawbacks in that they do not take into consideration the actual design data to determine the optimum location and capacitance values for decoupling capacitors and do not take into consideration the voltage noise distribution of the integrated circuit.

Therefore, it would be beneficial to have a system and method for automatic insertion of on-chip decoupling capacitors which takes into consideration the design data and predicted noise distribution of the integrated circuit when determining the location and capacitance values of decoupling capacitors.

SUMMARY OF THE INVENTION

The present invention provides a system and method for automatic insertion of on-chip decoupling capacitors. With the system and method of the present invention, an integrated circuit design is partitioned into cells and the voltage noise distribution per cell of an integrated circuit is determined. This voltage noise distribution may be generated using any of a number of different known mechanisms and generally results in a voltage noise-map being generated for the integrated circuit. Thereafter, a mapping function is applied to the voltage noise map for each cell to determine a required capacitance for the cells of the integrated circuit. From this required capacitance per cell, the necessary decoupling capacitors may be identified as well as the location for insertion of these decoupling capacitors. In a similar manner, decoupling capacitors may be removed from cells of the integrated circuit based upon the determined required capacitance per cell.

The present invention may be implemented as part of an integrated circuit design system. As such, the present invention may be implemented in hardware, software, or any combination of hardware and software. Any type of computer system, or other apparatus adapted for carrying out the methods described herein, may be used without departing from the spirit and scope of the present invention. A typical combination of hardware and software may be a general purpose computer system with a computer program that, when being loaded and executed, controls the computer system such that it carries out the methods described herein. The present invention may also be embedded in a computer program product, which comprises features enabling the implementation of the methods described herein and which, when loaded into a computer system, is able to carry out these methods.

These and other features and advantages of the present invention will be described in, or will become apparent to those of ordinary skill in the art in view of, the following detailed description of the preferred embodiments.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
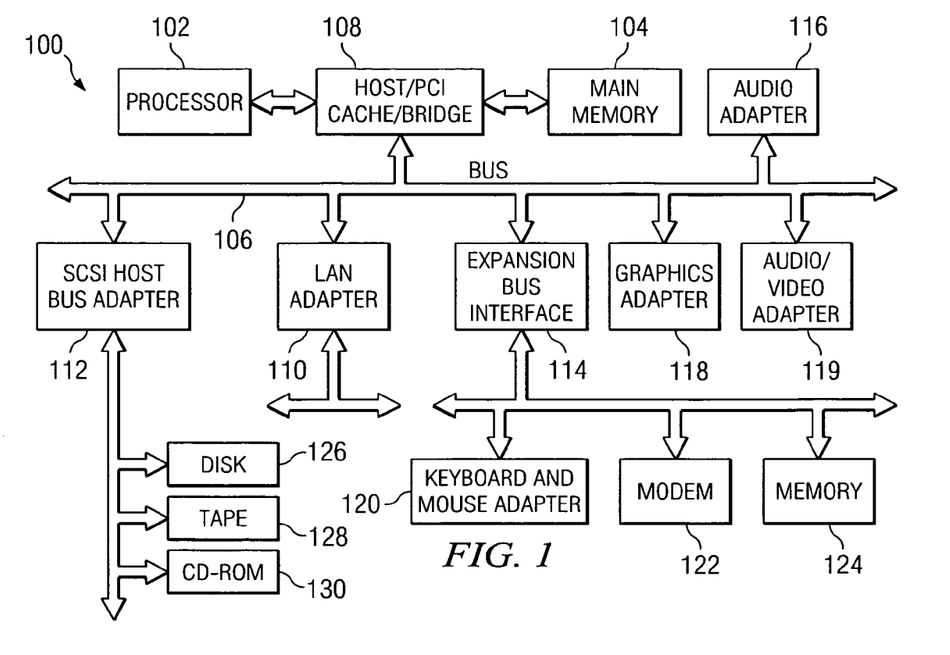
FIG. 1 is an exemplary block diagram of data processing system in which aspects of the present invention may be implemented.

The present invention provides a mechanism for determining the required capacitance for portions of an integrated circuit design and thus, the type and location for insertion of decoupling capacitors, in an integrated circuit design. The mechanism of the present invention is preferably implemented as part of an integrated circuit design system. As such, the present invention is preferably implemented in a computing system in which integrated circuit design software is executed. FIG. 1 is provided as one example of a computer system in which aspects of the present invention may be implemented. However, it should be appreciated that FIG. 1 is only exemplary and is not intended to state or imply any limitation with regard to the type or configuration of computer systems in which the present invention may be implemented.

With reference now to FIG. 1, a block diagram of a data processing system is shown in which the present invention may be implemented. Data processing system 100 is an example of a computer in which code or instructions implementing the processes of the present invention may be located. Data processing system 100 employs a peripheral component interconnect (PCI) local bus architecture. Although the depicted example employs a PCI bus, other bus architectures such as Accelerated Graphics Port (AGP) and Industry Standard Architecture (ISA) may be used. Processor 102 and main memory 104 are connected to PCI local bus 106 through PCI bridge 108. PCI bridge 108 also may include an integrated memory controller and cache memory for processor 102. Additional connections to PCI local bus 106 may be made through direct component interconnection or through add-in connectors. In the depicted example, local area network (LAN) adapter 110, small computer system interface (SCSI) host bus adapter 112, and expansion bus interface 114 are connected to PCI local bus 106 by direct component connection. In contrast, audio adapter 116, graphics adapter 118, and audio/video adapter 119 are connected to PCI local bus 106 by add-in boards inserted into expansion slots. Expansion bus interface 114 provides a connection for a keyboard and mouse adapter 120, modem 122, and additional memory 124. SCSI host bus adapter 112 provides a connection for hard disk drive 126, tape drive 128, and CD-ROM drive 130. Typical PCI local bus implementations will support three or four PCI expansion slots or add-in connectors.

An operating system runs on processor 102 and is used to coordinate and provide control of various components within data processing system 100 in FIG. 1. The operating system may be a commercially available operating system such as Windows XP, which is available from Microsoft Corporation. An object oriented programming system such as Java may run in conjunction with the operating system and provides calls to the operating system from Java programs or applications executing on data processing system 100. "Java" is a trademark of Sun Microsystems, Inc. Instructions for the operating system, the object-oriented programming system, and applications or programs are located on storage devices, such as hard disk drive 126, and may be loaded into main memory 104 for execution by processor 102.

Those of ordinary skill in the art will appreciate that the hardware in FIG. 1 may vary depending on the implementation. Other internal hardware or peripheral devices, such as flash read-only memory (ROM), equivalent nonvolatile memory, or optical disk drives and the like, may be used in addition to or in place of the hardware depicted in FIG. 1. Also, the processes of the present invention may be applied to a multiprocessor data processing system.

For example, data processing system 100, if optionally configured as a network computer, may not include SCSI host bus adapter 112, hard disk drive 126, tape drive 128, and CD-ROM 130. In that case, the computer, to be properly called a client computer, includes some type of network communication interface, such as LAN adapter 110, modem 122, or the like. As another example, data processing system 100 may be a stand-alone system configured to be bootable without relying on some type of network communication interface, whether or not data processing system 100 comprises some type of network communication interface. As a further example, data processing system 100 may be a personal digital assistant (PDA), which is configured with ROM and/or flash ROM to provide non-volatile memory for storing operating system files and/or user-generated data.

The depicted example in FIG. 1 and above-described examples are not meant to imply architectural limitations. For example, data processing system 100 also may be a notebook computer or hand held computer in addition to taking the form of a PDA. Data processing system 100 also may be a kiosk or a Web appliance.

The processes of the present invention are performed by processor 102 using computer implemented instructions, which may be located in a memory such as, for example, main memory 104, memory 124, or in one or more peripheral devices 126-130. As mentioned above, the processes of the present invention include partitioning an integrated circuit design into portions or cells, determining voltage noise maps for each portion or cell, and then applying a mapping function to the voltage noise map to determine a required capacitance, and thus a type of decoupling capacitor, for each portion or cell. Thereafter, the particular types of decoupling capacitors may then be inserted into the identified locations in the integrate circuit design. This process may be iteratively repeated until a desired functionality of the integrated circuit design is achieved.

The first operation to be performed in order to implement the mechanisms of the present invention is to generate a voltage noise distribution prediction or voltage noise map of the integrated circuit design. As part of this process, the integrated circuit design may be partitioned into cells and the voltage noise map for each cell may be predicted. This prediction may be performed in any of a number of different ways. Examples of systems and methods that may be used to generate these voltage noise map predictions include the systems and methods described in commonly assigned U.S. Pat. No. 6,665,843 entitled "Method and System for Quantifying the Integrity of an On-Chip Power Supply Network," issued Dec. 16, 2003, and U.S. Patent Application Publication 2003/0088395 entitled "Method and System for Quantifying Dynamic On-Chip Power Distribution," published May 8, 2003, both of which are hereby incorporated by reference.

In one exemplary embodiment of the present invention, using a methodology similar to that of U.S. Patent Application Publication 2003/0088395, the voltage noise map for the cells of the integrated circuit design is generated by first obtaining a design data set representing technical details of the integrated circuit, which may be referred to as circuit data. The circuit data may include wiring geometries and material information that impacts the wiring/propagation properties is also obtained. In addition, the circuit data may include the switching probability, also referred to as "activity," of the electrical elements powered by the power distribution system that is determined in order to more accurately determine the power demand of the electrical elements.

Then, a first representation of the power distribution system, which is a multiple layered power distribution system representation, is converted into a second representation of the power distribution system that reduces the complexity of the representation by at least one wiring layer. For example, the first representation is converted into an equivalent pair of parallel planes, whereby the electrical properties of the power distribution system are mapped into parameters of a planar equivalent circuit.

Thereafter, the dynamic behavior of the integrated circuit, based on the second representation, is analyzed. As a result, the voltage level variation is calculated for each segment of the power distribution system or each electrical element. This voltage level variation is then used to generate a voltage noise map. For more information regarding this methodology, reference is made to incorporated U.S. Patent Publication 2003/0088395.

Having obtained a voltage noise map for the integrated circuit, or for each cell of the integrated circuit, the present invention applies a required capacitance mapping function to the voltage noise map to thereby determine a required capacitance for reduction of the voltage noise and maintaining of the impedance as low as possible in each cell of the integrated circuit. A multitude of mapping functions are possible. In exemplary embodiments, the mapping function is a monotonously increasing function, although single exceptions to this monotonously increasing function may be made without departing from the spirit and scope of the present invention. In one exemplary embodiment, this required capacitance mapping function takes the form:

$$c(x,y) = \text{gamma} * (u(x,y) - \text{alpha})^{\text{beta}} \text{ for } abs(u(x,y) - \text{alpha}) > \text{threshold; and}$$

0 for $abs(u(x,y) - \text{alpha}) < \text{threshold}$.

where c(x,y) is the capacitance for the cell location on the integrated circuit given by grid coordinates x and y and u(x,y) is the voltage noise in the voltage noise map at the cell location (x,y). The threshold value defines an area of noise-values for which no action is required. This is useful to reduce the design changes only to those areas with severe noise-problems.

In the above mapping function, alpha is a noise value [mV], equal or greater than zero. Depending on the particular implementation of the present invention, several interpretations of the alpha value are possible. Of course, in one exemplary implementation, alpha may be set to zero. If a noise target is available alpha may be set to the noise target value. Another possibility is to set alpha to an average noise value in order to help balance the noise map. For purposes of ease of explanation of the present invention, the present description will consider cases with alpha=0. This means that insertion of additional decoupling capacitors is considered first.

Figure 2:
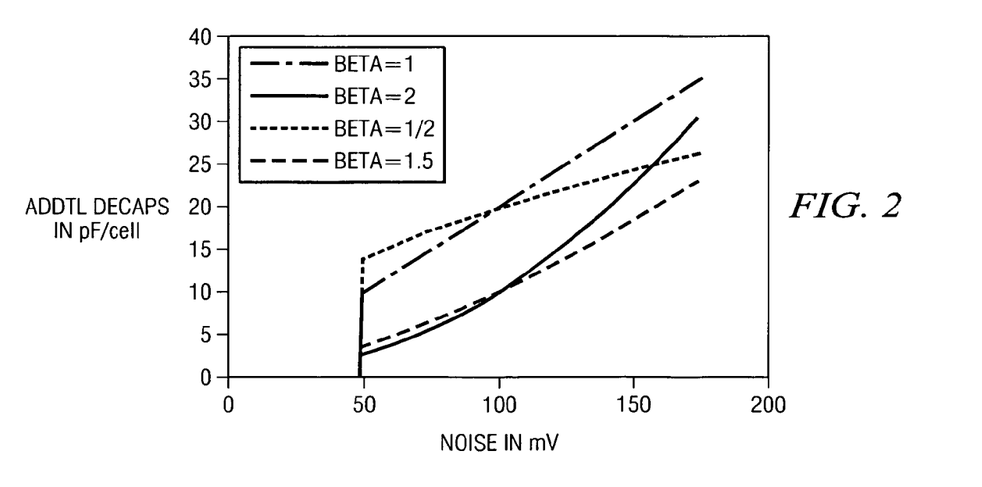
FIG. 2 is an exemplary plot of mapping functions using different beta values in accordance with an exemplary embodiment of the present invention.

The parameter beta in the above mapping function selects the characteristic of the mapping function. Typical values are beta=1, beta=1.5, beta=2 or beta=0.5. Other real numbers for beta are also possible without departing from the spirit and scope of the present invention. As mentioned above, other monotonously increasing functions mi(u(x,y)–alpha) may also be used within the scope of the present invention. FIG. 2 is an exemplary plot of mapping functions using different beta values in accordance with an exemplary embodiment of the present invention. As shown in FIG. 2, the slopes of the lines generated by the various mapping functions indicate a rate at which the number of decoupling capacitors that need to be inserted increases as the noise in the cell increases.

The parameter gamma translates the local noise number into a capacitance value to be added into each cell. The units of gamma is pF/mV^beta. Gamma can be understood as a density of added capacitance per mV of noise multiplied by the cell size. The value of gamma may depend on the chip-technology, the cell-size, the logic already designed, the amount of noise that is intended to be reduced in one iteration, the number of iterations, and other parameters.

To better understand the gamma value in the above mapping function, the following example is used for illustrative purposes. Assume C0 is the quiet capacitance in the considered cell, U0 is the noise that occurs in this cell, and beta is chosen to be 1. In the first order, by doubling the quiet capacitance one can expect the HF-noise to be halved. This gives a reasonable value for gamma, i.e. gamma=C0/U0/2. Assuming a cell size of 0.01 mm^2, 0.2 pF/mV is one realistic value that could be used for gamma.

For positive values of this mapping function, a required capacitance for the cell location (x,y) is identified. From this required capacitance, a determination of the type of decoupling capacitor or capacitors that are to be inserted into the corresponding cell may be made. These decoupling capacitors may then be inserted into the integrated circuit design at the cell location and the process repeated to determine how the voltage noise is changed by the insertion of the decoupling capacitors as well as determine if additional decoupling capacitor insertion or removal is necessary to obtain a desired behavior of the integrated circuit design.

For (u(x,y)–alpha)<0, i.e. by using alpha>0 mV, the required capacitance mapping function describes decoupling capacitors that can be removed from the particular cell location (x,y). The gamma-value may be used to reflect the actual amount of decoupling capacitors within the cell that can be removed.

In areas where the design is very crowded, it is possible that there is not sufficient space available to accommodate the required additional decoupling capacitors. In this case, the mapping function may also be used to determine an amount of logic that has to be removed into other areas on the chip. In other words, the mapping function indicates the number of decoupling capacitors that need to be added to the cell. This number can be converted to an area of the cell that needs to be made available for the inclusion of the additional decoupling capacitors. This area may then be used to determine how much area currently occupied by logic elements needs to be freed in order to be able to insert the required number of decoupling capacitors.

It should be appreciated that many modifications to this methodology may be made without departing from the spirit and scope of the present invention. For example, the mapping function can be piecewise defined, having different functions or coefficients for (u(x,y)–alpha)>0 and (u(x,y)–alpha)<0. In addition, rather than using the same required capacitance mapping function for all conditions, various required capacitance mapping functions may be defined for different conditions of the voltage noise map.

The mapping function of the present invention may be implemented using a number of iterations of the present invention. For example, one iteration of the mapping function, which uses a given value gamma1, may be replaced with two iterations using a reduced gamma2=gamma1/2. In using two iterations with a smaller gamma value, the results will be similar but not identical to the original single iteration but will usually improve the adaptation of the decoupling to the chip design. The same is true when replacing one iteration by N iterations and using gammaN=gamma1/N instead.

As chip designs usually take many days to complete verification, it is reasonable to perform the iteration periodically, e.g. at the end of each working day. In this case the value of gamma might be changed during the iteration. It should be noted, however, that if the value of gamma is too small, additional iterations of the present invention may be required. If gamma is to large, granularity is lost and may cause a problem in the final chip design. In addition, it is noted that in the chip design, the density of quiet capacitance increases from small values to their final maximum values, therefore gamma may be adapted to the actual quiet capacitance density.

Figure 3:
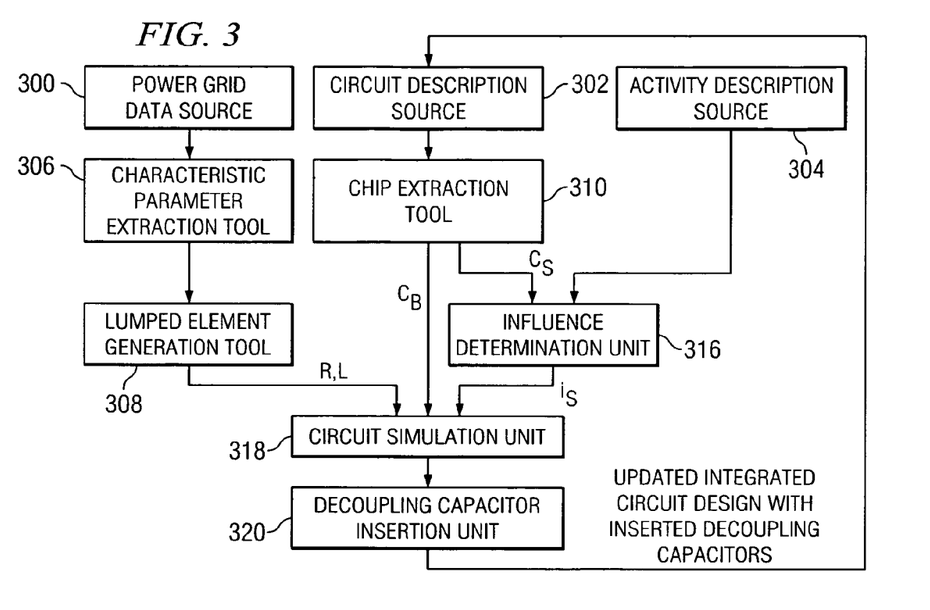
FIG. 3 is an exemplary block diagram illustration the primary operational components of one exemplary embodiment of the present invention.

FIG. 3 is an exemplary block diagram illustration the primary operational components of one exemplary embodiment of the present invention. As shown in FIG. 3, power grid data source 300, circuit description source 302 and activity description source 304 provide information, i.e. circuit data, about the power grid, the circuits and the activity, i.e. switching probability of the circuit elements, for use by the circuit simulation mechanism of the present invention. The power grid description contains the wiring geometries and material information that impacts the wiring/propagation properties, such as the line width, height, spacing, conductivity, losses, dielectric constant etc. The circuit description contains the circuit parameters that impact the power noise. Typically this includes the placement and routing, switching and non-switching capacitance and may also include the decoupling capacitors. Instead of final routing, a routing estimate is possible. Since in real life scenarios, not all gates switch at every clock cycle, from the activity information, i.e., the probability of a gate switching in one clock cycle, is taken into consideration. However, if the exact switching activity is not known, an estimate might be taken instead.

From the power grid description, a characteristic parameter extraction tool 306 extracts the characteristic parameters of the equivalent planes. As a result of the extraction, characteristic parameters of parallel planes R, L, C" and G" are derived. This is done by dividing the parallel planes of the power distribution system into segments, such as multiple square portions or cells. The segments may be of any shape, preferably of square or rectangular shape.

Then, as a preparation for the numerical simulation of the power grid, a lumped element generation tool 308 represents the created segments or cells as lumped elements, i.e. the resistance and inductance elements of the created segments or cells are represented as a single resistance and inductance element (see U.S. Patent Application Publication 2003/0088395). In a preferred embodiment of the present invention, the lumped element generation tool is based on electromagnetic field solvers. However, basically any tool or methodology able to extract lumped element equivalents is suitable to be used. For example, any 3D extraction for the cells may be used. In the case of homogenous wiring structures, also 2D extraction may be used.

Chip extraction tool 310 extracts information from the circuit description obtained from circuit description source 302. From the circuit description, the distribution of non-switching circuit capacitance $C_0$ is available. Inside a cell all non-switching capacitance $C_0$ and the power wiring capacitance $C_W$ is collected into one lumped capacitance value $C_B=C_0+C_W$. Usually, but not necessarily, the wiring capacitance can be neglected, i.e., $C_W \ll C_0$, compared to the non-switching circuit capacitance.

On the other hand, switching circuit capacitance $C_S$ is extracted from the circuit information. The influence of the switching circuit capacitance $C_S$ on the behavior of the power distribution system is determined by influence determination unit 316 by taking the activity information into account from activity information source 304. In the derived representation of the power distribution system the circuit switching and activity may be modeled by equivalent switching current distribution $i_s$.

From all such information derived from a first representation of the power distribution system formed by the power grid, the circuit information, and the activity information, a converted and simplified representation is built that can be simulated. The converted representation may look like a 2D transmission line model. Alternatively the conductance G may also be added to this model. Furthermore, R and L elements of adjacent cells can be merged.

The circuit simulation unit 318 calculates the voltage change DU in relation to the respective segment of the power distribution system. From this information, a voltage noise map is generated for the segments or cells of the integrated circuit design. This voltage noise map is provided to decoupling capacitor insertion unit 320. The decoupling capacitor insertion unit 320 applies a required capacitance mapping function to the voltage noise map to determine a required capacitance for each segment or cell of the integrated circuit design. Based on this required capacitance, one or more decoupling capacitors having the required capacitance may be inserted into the segment or cell. The updated circuit design, containing the additional or removed, decoupling capacitors may then be provided to extraction tool 310 and the process repeated. Adding/removing decoupling capacitors may also require minor changes to the power wiring as well. This operation may be performed iteratively until a desired voltage noise map is achieved for the segments or cells of the integrated circuit design. This analysis feedback loop provides a method to reduce on-chip voltage noise.

Figure 4A:
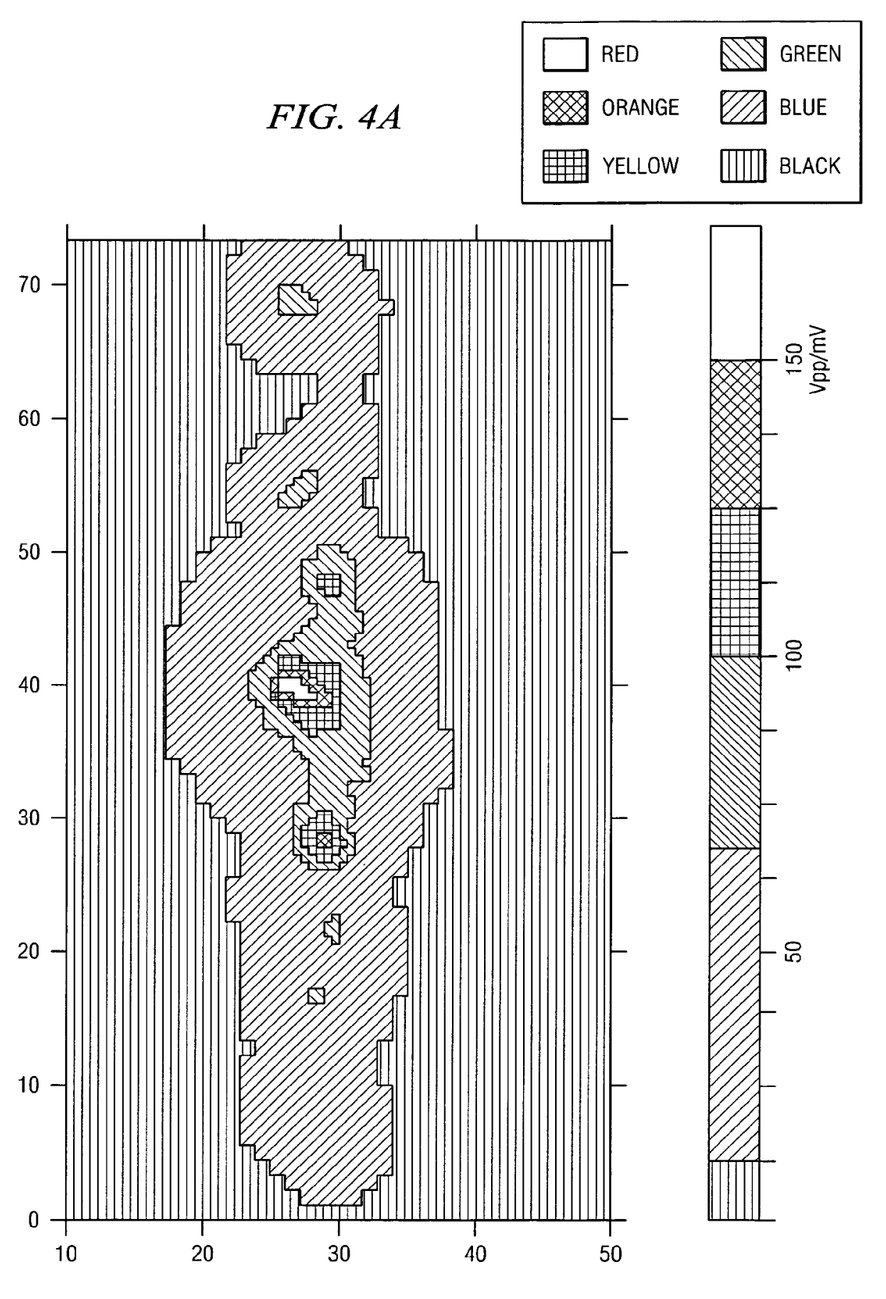
FIG. 4A is an exemplary diagram illustrating a voltage noise map prior to decoupling capacitor insertion in accordance with the present invention.

FIG. 4A is an exemplary diagram illustrating a noise map of an entire chip prior to decoupling capacitor insertion in accordance with the present invention. The example shown in FIG. 4A is a predicted noise map for an entire integrated circuit design. As shown in FIG. 4A, the maximum noise predicted to be experienced by the integrated circuit design is 165 mV. For this analysis the chip has been subdivided into 60×77 square cells of equal size.

Figure 4B:
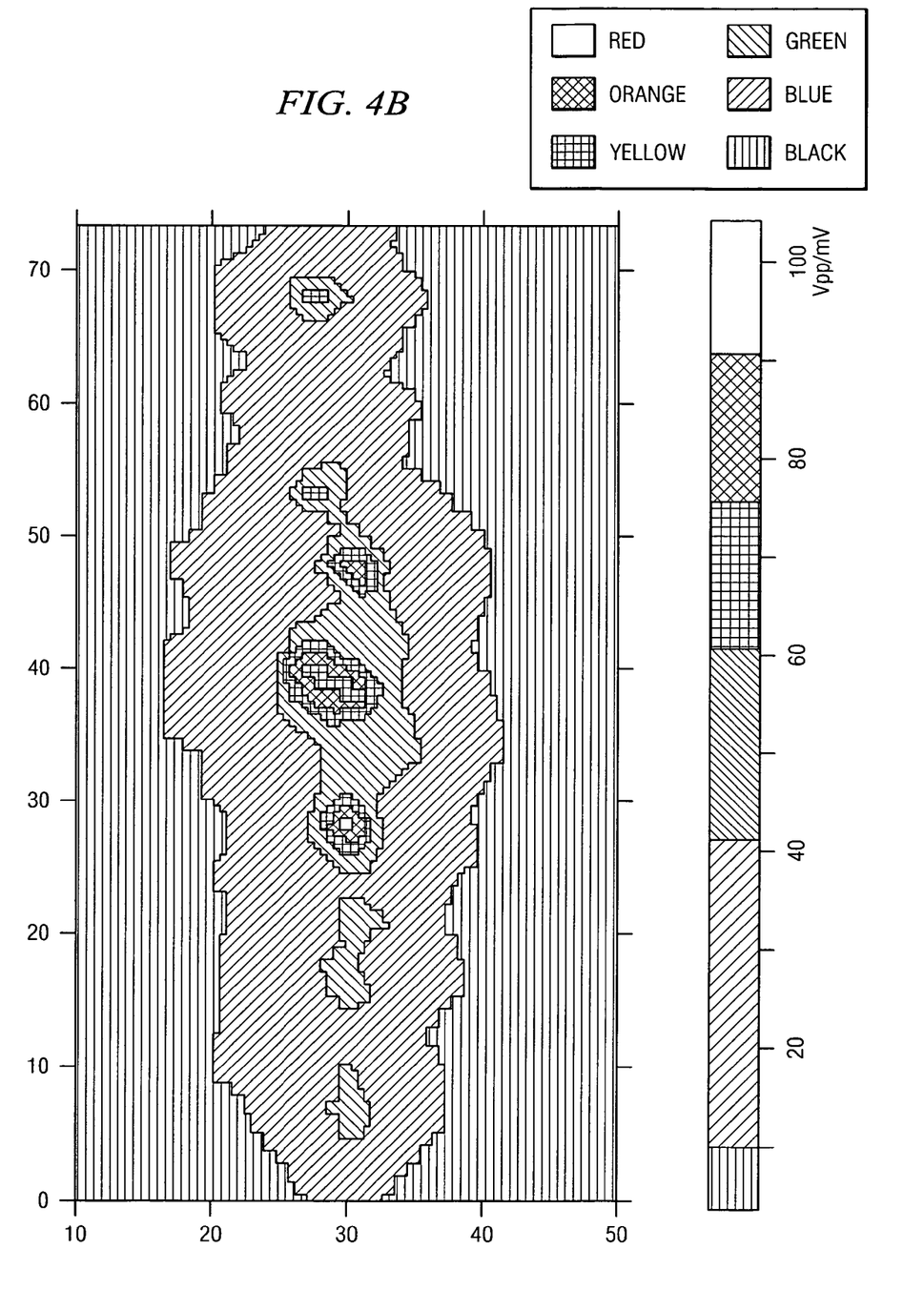
FIG. 4B is an exemplary diagram illustrating a voltage noise map after decoupling capacitor insertion in accordance with the present invention.

FIG. 4B is an exemplary diagram illustrating a noise map after decoupling capacitor insertion in accordance with the present invention. The noise map shown in FIG. 4B is generated after one iteration of the present invention in which decoupling capacitors are inserted based on the mapping function described above. As shown in FIG. 4B, the maximum noise experienced by the integrated circuit is determined to be 105 mV. Thus, by performing decoupling capacitor insertion in accordance with the present invention, a reduction in the maximum noise experienced in the integrated circuit may be achieved.

Figure 5:
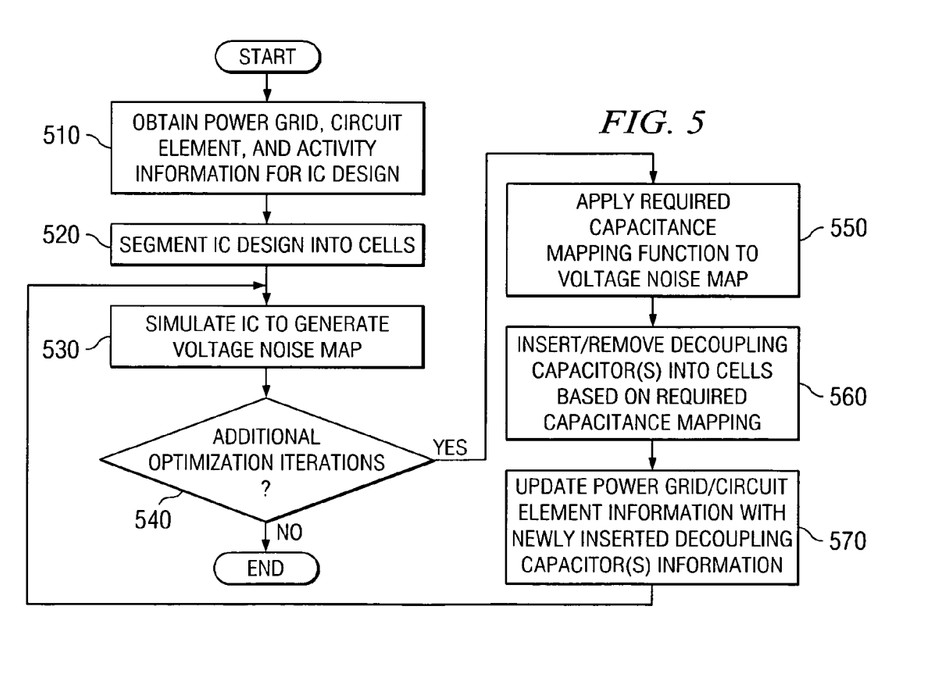
FIG. 5 is a flowchart outlining an exemplary operation of one exemplary embodiment of the present invention.

FIG. 5 is a flowchart outlining an exemplary operation of one exemplary embodiment of the present invention. It will be understood that each block of the flowchart illustration, and combinations of blocks in the flowchart illustration, can be implemented by computer program instructions. These computer program instructions may be provided to a processor or other programmable data processing apparatus to produce a machine, such that the instructions which execute on the processor or other programmable data processing apparatus create means for implementing the functions specified in the flowchart block or blocks. These computer program instructions may also be stored in a computer-readable memory or storage medium that can direct a processor or other programmable data processing apparatus to function in a particular manner, such that the instructions stored in the computer-readable memory or storage medium produce an article of manufacture including instruction means which implement the functions specified in the flowchart block or blocks.

Accordingly, blocks of the flowchart illustration support combinations of means for performing the specified functions, combinations of steps for performing the specified functions and program instruction means for performing the specified functions. It will also be understood that each block of the flowchart illustration, and combinations of blocks in the flowchart illustration, can be implemented by special purpose hardware-based computer systems which perform the specified functions or steps, or by combinations of special purpose hardware and computer instructions.

As shown in FIG. 5, the operation starts by receiving power grid information, circuit element information, and activity information for the integrated circuit design (step 510). From this information, the integrated circuit design is segmented into cells (step 520) and simulated to generate a voltage noise map (step 530).

A determination is then made as to whether an additional optimization iteration is desirable (step 540). This may be a determination, for example, based on whether the maximum and minimum voltage noise values for cells of the integrated circuit design are within a predetermined range of acceptable values. If additional optimization iterations are not necessary, the operation terminates.

If further optimizations are desirable, a required capacitance mapping function is applied to the voltage noise map for each cell of the integrated circuit design to identify a required capacitance for each cell of the integrated circuit design (step 550). Thereafter, decoupling capacitors are inserted/removed from the cells of the integrated circuit design in accordance with the determined required capacitance for each cell (step 560). The updated integrated circuit design is used as a basis for generating update power grid information (step 570) and the process returns to step 530.

Thus, the present invention provides a mechanism for automatically inserting or removing on-chip decoupling capacitors. The mechanisms of the present invention introduce or remove decoupling capacitors adaptively, iteratively, and automatically based on the design data and the corresponding predicted voltage noise distribution. As a result, a more optimized integrated circuit power grid design is made possible through use of the present invention.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method, in a data processing system, for decoupling capacitor insertion in a circuit design, comprising:

obtaining circuit data, wherein the circuit data identifies characteristics of the circuit design;

partitioning the circuit design into one or more cells based on the circuit data;

determining a voltage noise map for each cell of the one or more cells;

applying a required capacitance mapping function to the voltage noise map for each cell of the one or more cells to identify a required capacitance for each cell of the one or more cells;

inserting one or more decoupling capacitors into at least one cell of the one or more cells based on the required capacitance for the at least one cell; and outputting a new voltage noise map including the one or more decoupling capacitors inserted into the at least one cell, wherein the required capacitance mapping function is:

$c(x,y)=\text{gamma}*(u(x,y)-\text{alpha})^\text{beta}$ for $abs(u(x,y)-\text{alpha})>\text{threshold}$; and 0 for $abs(u(x,y)-\text{alpha})<\text{threshold}$, where c(x,y) is a capacitance for the cell location on the integrated circuit given by arid coordinates x and y, u(x,y) is a voltage noise at the cell located at grid coordinates x and y, alpha is a noise value, beta is a mapping function characteristic value, and gamma is a translation parameter for converting local noise into a capacitance value.

2. The method of claim 1, wherein the required capacitance mapping function is a monotonously increasing function.

3. The method of claim 1, wherein if the required capacitance mapping function results in a required capacitance less than zero, decoupling capacitors are removed from the at least one cell of the one or more cells.

4. The method of claim 1, wherein a value for alpha is one of 0, a target noise value, and an average noise value.

5. The method of claim 1, wherein beta is approximately one of 1, 1.5, 2 and 0.5.

6. The method of claim 1, further comprising:
   determining an area of the at least one cell populated by logic that needs to be freed in order to insert the one or more decoupling capacitors.

7. A computer program product in a computer readable medium for decoupling capacitor insertion in a circuit design, comprising:
   first instructions for obtaining circuit data, wherein the circuit data identifies characteristics of the circuit design;
   second instructions for partitioning the circuit design into one or more cells based on the circuit data;
   third instructions for determining a voltage noise map for each cell of the one or more cells;
   fourth instructions for applying a required capacitance mapping function to the voltage noise map for each cell of the one or more cells to identify a required capacitance for each cell of the one or more cells;
   fifth instructions for inserting one or more decoupling capacitors into at least one cell of the one or more cells based on the required capacitance for the at least one cell; and
   sixth instructions for outputting a new voltage noise map including the one or more decoupling capacitors inserted into the at least one cell, wherein the required capacitance mapping function is:

$c(x,y) = \text{gamma}*(u(x,y)-\text{alpha})^\text{beta}$ for $\text{abs}(u(x,y)-\text{alpha}) > \text{threshold}$; and 0 for $\text{abs}(u(x,y)-\text{alpha}) < \text{threshold}$, where $c(x,y)$ is a capacitance for the cell location on the integrated circuit given by grid coordinates x and y, $u(x,y)$ is a voltage noise at the cell located at grid coordinates x and y, alpha is a noise value, beta is a mapping function characteristic value, and gamma is a translation parameter for converting local noise into a capacitance value.

8. The computer program product of claim 7, wherein the required capacitance mapping function is a monotonously increasing function.

9. The computer program product of claim 7, wherein if the required capacitance mapping function results in a required capacitance less than zero, decoupling capacitors are removed from the at least one cell of the one or more cells.

10. The computer program product of claim 7, wherein a value for alpha is one of 0, a target noise value, and an average noise value.

11. The computer program product of claim 7, wherein beta is approximately one of 1, 1.5, 2 and 0.5.

12. The computer program product of claim 7, further comprising:
    seventh instructions for determining an area of the at least one cell populated by logic that needs to be freed in order to insert the one or more decoupling capacitors.

13. A system for decoupling capacitor insertion in a circuit design, comprising:
    one or more circuit design data sources;
    a circuit simulation engine coupled to the one or more circuit design data sources; and
    a decoupling capacitor insertion engine coupled to the circuit simulation engine, wherein the one or more circuit design data sources provide circuit data identifying characteristics of the circuit design,
    wherein the circuit simulation engine partitions the circuit design into one or more cells based on the circuit data and determines a voltage noise map for each cell of the one or more cells,
    wherein the decoupling capacitor insertion engine applies a required capacitance mapping function to the voltage noise map for each cell of the one or more cells to identify a required capacitance for each cell of the one or more cells,
    wherein the decoupling capacitor insertion engine inserts one or more decoupling capacitors into at least one cell of the one or more cells based on the required capacitance for the at least one cell, and
    wherein the circuit simulation engine outputs a new voltage noise map including the one or more decoupling capacitors inserted into the at least one cell, wherein the required capacitance mapping function is:

$c(x,y) = \text{gamma}*(u(x,y)-\text{alpha})^\text{beta}$ for $\text{abs}(u(x,y)-\text{alpha}) > \text{threshold}$; and 0 for $\text{abs}(u(x,y)-\text{alpha}) < \text{threshold}$, where $c(x,y)$ is a capacitance for the cell location on the integrated circuit given by grid coordinates x and y, $u(x,y)$ is a voltage noise at the cell located at grid coordinates x and y, alpha is a noise value, beta is a mapping function characteristic value, and gamma is a translation parameter for converting local noise into a capacitance value.

14. The system of claim 13, wherein the required capacitance mapping function is a monotonously increasing function.

15. The system of claim 13, wherein if the required capacitance mapping function results in a required capacitance less than zero, the decoupling capacitor insertion engine removes decoupling capacitors from the at least one cell of the one or more cells.

16. The system of claim 13, wherein a value for alpha is one of 0, a target noise value, and an average noise value.

17. The system of claim 13, wherein the decoupling capacitor insertion engine determines an area of the at least one cell populated by logic that needs to be freed in order to insert the one or more decoupling capacitors.

* * * * *